United States Patent
Hirase

[11] Patent Number: 5,114,683
[45] Date of Patent: May 19, 1992

[54] THERMAL DECOMPOSITION TRAP

[75] Inventor: Ikuo Hirase, Toride, Japan

[73] Assignee: L'Air Liquide, Societe Anonyme Pour L'Etude et L'Exploitation des Procedes Georges Claude, Paris, France

[21] Appl. No.: 477,754

[22] Filed: Feb. 9, 1990

[30] Foreign Application Priority Data

Feb. 13, 1989 [EP] European Pat. Off. ......... 89400388.8

[51] Int. Cl.$^5$ .............................................. F01N 3/10
[52] U.S. Cl. .................................. 422/173; 55/269; 55/300; 55/355; 422/307; 422/310
[58] Field of Search ................ 55/355, 269, 278, 300; 422/173, 310, 307

[56] References Cited

U.S. PATENT DOCUMENTS

| | | | |
|---|---|---|---|
| 514,814 | 2/1894 | Cooper | 55/355 X |
| 1,928,706 | 10/1933 | Sillers | 55/355 X |
| 2,045,519 | 6/1936 | Coutant | 55/300 X |
| 3,093,466 | 6/1963 | Zankey | 55/355 X |
| 4,183,982 | 1/1980 | Kraus | 427/248.1 |

OTHER PUBLICATIONS

John Wiley & Sons, New York, 1955, pp. 8–9, C. F. Powell et al., "Vapor-Plating".
Journal of Metals JOM, vol. 37, No. 6, Jun. 1985, pp. 63–71, Warrendale, Pennsylvania, US, M. L. Green et al., "Chemical Vapor Deposition of Metals for Integrated Circuit Applications".

*Primary Examiner*—Robert J. Warden
*Assistant Examiner*—Amalia L. Santiago
*Attorney, Agent, or Firm*—Oblon, Spivak, McClelland, Maier & Neustadt

[57] ABSTRACT

A thermal decomposition trap includes a trap main body (21) having an inlet port (26) for supplying a gas to be thermally decomposed and an outlet port (27) for exhausting the gas, and a heater (23, 25) for heating the gas supplied in the trap main body (21). An oil trap (28) containing an oil and having an oil discharge port (29) and a valve (V3) connected thereto is formed on a bottom portion of the trap main body (21). Particles generated by thermal decomposition of the gas are precipitated in the oil in the oil trap (28). The oil containing the particles is easily discharged in a short time period by opening the valve (V3) mounted on the oil discharge port (29). An oil-free auxiliary pump is arranged between a reaction chamber and the thermal decomposition trap, whereby a mass flow rate of exhaust from rate in the reaction chamber is not reduced regardless of the arrangement of the thermal decomposition trap.

8 Claims, 2 Drawing Sheets

THERMAL DECOMPOSITION TRAP

The present invention relates to a thermal decomposition apparatus for various compounds and, more particularly, to a thermal decomposition apparatus comprising an improved thermal decomposition trap.

Various inorganic halides, inorganic hydrides and organic metal compounds are widely used as materials for thin film formation by CVD or the like in a semiconductor manufacturing process. These compounds have come to be used increasingly in recent years with the rapid development of the semiconductor industry. These compounds are supplied in a gaseous state into a reaction chamber evacuated by a rotary pump to form a thin film. After thin film formation, any residual non-reacted gas and a by-product of the reaction are exhausted by the rotary pump.

However, these non-reacted gas and by-product gas of the reaction react with an oil in the rotary pump when they pass through the pump, thereby degrading the oil and damaging the pump. In order to eliminate this drawback, a system is proposed in which a thermal decomposition trap is arranged before the rotary pump so that the above gases are flowed through the thermal decomposition trap and thermally decomposed into substances not reacting with the oil. FIG. 1 shows an arrangement of such a thermal decomposition trap.

In the thermal decomposition trap shown in FIG. 1, heater chamber 2, opened to outer atmosphere, for housing heater 3, is inserted near a central portion of trap main body 1. Main body 1 houses copper mesh plates 4 so that plates 4 surround chamber 2. Band heater 5 is wound around main body 1. Inlet port 6 and outlet port 7 are formed in lower and upper portions of main body 1, respectively.

In the above thermal decomposition trap, a gas from the reaction chamber is supplied from inlet port 6 in main body 1 and thermally decomposed on plates 4 heated by heaters 3 and 5. The decomposed gas is exhausted from outlet port 7 to a rotary pump. Since the decomposed gas does not react with nor degrade an oil in the rotary pump, the rotary pump is not damaged.

In the above thermal decomposition trap, however, particles generated by thermal decomposition of the gases are deposited on bottom portion 8 of main body 1. Conventionally, the deposited particles are removed by detaching bottom portion 8 of main body 1 after an operation is stopped. These particles are, however, toxic and pose a critical problem because they are externally scattered when they are removed from bottom portion 8 of main body 1.

As shown in FIG. 2, thermal decomposition trap 11 is arranged on the downstream side immediately after reaction chamber 12, and oil trap 13, mechanical booster pump 14 and rotary pump 15 are arranged on its down-stream side. Since the units are arranged in this manner, a mass flow rate of exhaust from chamber 12 obtained by pumps 14 and 15 is significantly reduced due to a pressure loss in trap 11.

It is, therefore, an object of the present invention to provide a thermal decomposition trap capable of easily removing particles generated by thermal decomposition of gases from a bottom portion of a trap main body.

It is another object of the present invention to provide a thermal decomposition apparatus in which an exhaust rate in a reaction chamber is not reduced regardless of the arrangement of a thermal decomposition trap.

According to the present invention, there is provided a thermal decomposition trap comprising a trap main body having an inlet port for supplying a gas to be thermally decomposed and an outlet port for exhausting the gas, and heating means for heating the gas supplied in the thermal decomposition trap main body, wherein an oil trap containing an oil and having an oil discharge port and a valve connected thereto is formed on a bottom portion of the trap main body.

In the thermal decomposition trap of the present invention, the oil trap is formed on the bottom portion of the trap main body. An oil, for example a pump oil, is contained to a predetermined level in the oil trap. Particles generated by thermal decomposition of the gas drop into the oil. The valve is mounted on the oil discharge port formed in the bottom portion of the oil trap. The oil containing the particles is discharged by opening the valve.

In order to prevent evaporation and decomposition of the oil, it is preferable to locate a cooling means around the oil trap.

According to the thermal decomposition trap of the present invention, the particles generated by thermal decomposition of the gas can be easily removed from the trap in a short time period while they are kept shielded from outer atmosphere.

In addition, according to the present invention, there is provided a thermal decomposition apparatus comprising a reaction chamber, a thermal decomposition trap for thermally decomposing a gas from the reaction chamber, and an oil-free auxiliary pump and a main pump for exhausting the reaction chamber, wherein the thermal decomposition trap comprises a trap main body having an inlet port for supplying the gas from the reaction chamber and an outlet port for exhausting the gas, heating means for heating the gas supplied in the trap main body, and an oil trap, mounted on a bottom portion of the trap main body, containing an oil, and having an oil discharge port and a valve connected thereto, the auxiliary pump is connected to an outlet port of the reaction chamber and the inlet port of the thermal decomposition trap, and the main pump is connected to the outlet port of the thermal decomposition trap.

According to the thermal decomposition apparatus of the present invention, the oil-free auxiliary pump is arranged immediately after the reaction chamber. Therefore, an exhaust rate in the reaction chamber is not reduced regardless of the arrangement of the thermal decomposition trap and can be adjusted without varying the pressure in the reaction chamber.

Examples of the gas to be decomposed by the thermal decomposition trap and the thermal decomposition apparatus of the present invention are inorganic halides such as $WF_6$, $MoF_6$ and $TiCl_4$; organic metal compounds such as $Al(C_2H_5)_3$, $Al(CH_3)_3$, $Al(iC_4H_9)_3$, $Zn(C_2H_5)_3$, $Cd(CH_3)_2$, $In(C_2H_5)_3$, $Ga(CH_3)_3$, $Ga(C_2H_5)_3$, $P(CH_3)_3$, $P(C_2H_5)_3$, $As(CH_3)_3$, $As(C_2H_5)_3$, $B(CH_3)_3$, $B(C_2H_5)_3$, $Si(CH_3)_4$, $Si(C_2H_5)_4$, $Si(OCH_3)_4$, and $Si(OC_2H_5)_4$; and inorganic hydrides such as $SiH_4$, $Si_2H_6$ and $Si_3H_8$.

BRIEF DESCRIPTION OF THE DRAWINGS

This invention can be more fully understood from the following detailed description when taken in conjunction with the accompanying drawings, in which.

An embodiment of the present invention will be described below with reference to the accompanying drawings.

Figure 1:
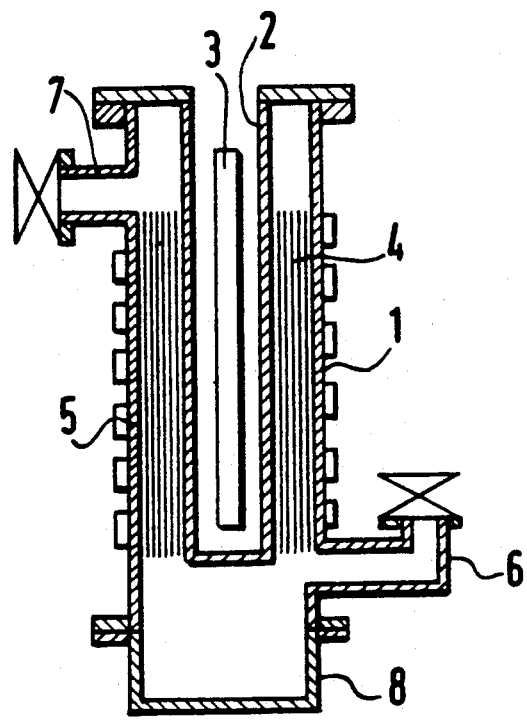
FIG. 1 is a sectional view showing a conventional thermal decomposition trap.
Figure 2:
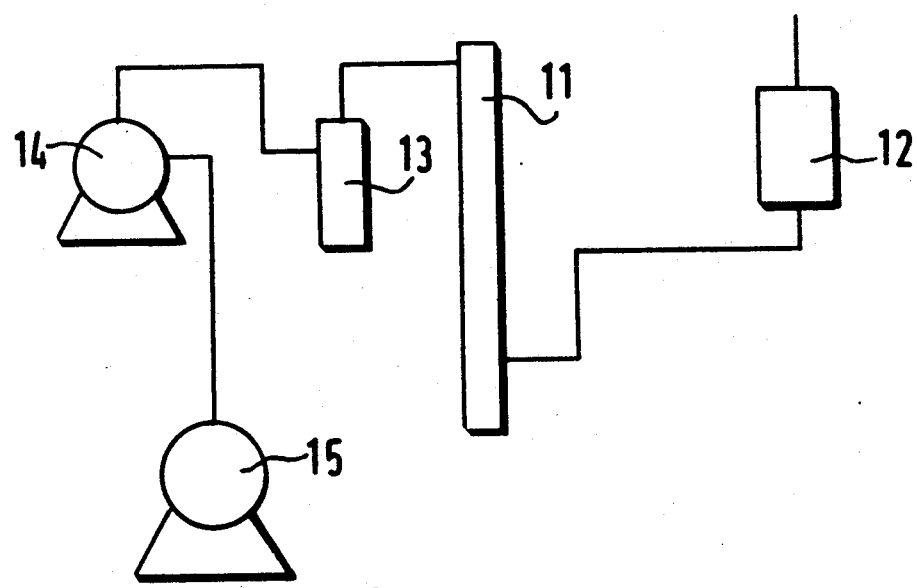
FIG. 2 is a flowchart of a thermal decomposition apparatus adopting the thermal decomposition trap shown in FIG. 1.
Figure 3:
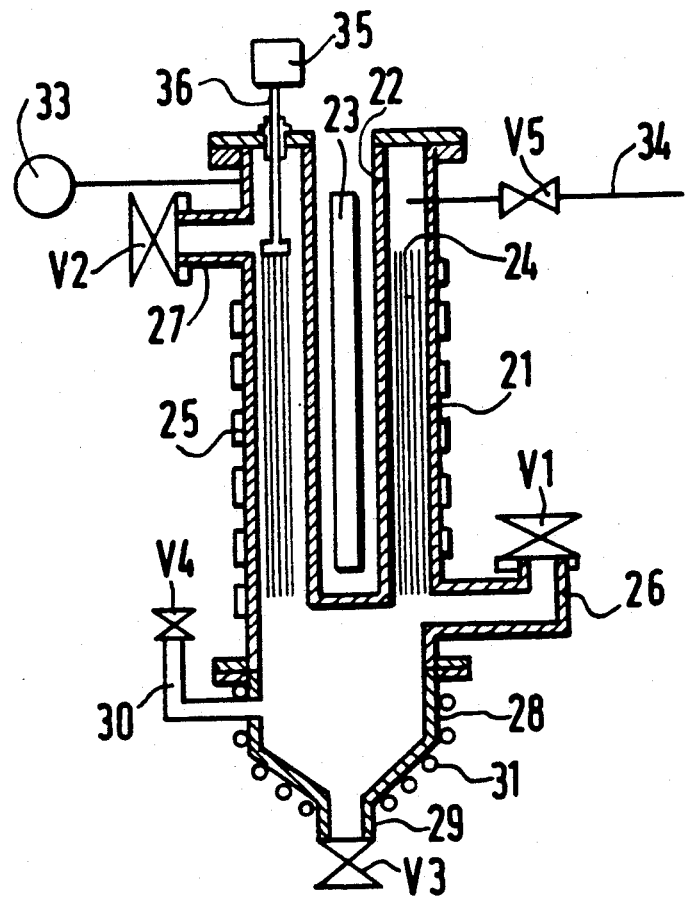
FIG. 3 is a sectional view showing the thermal decomposition trap according to an embodiment of the present invention.

FIG. 3 is a sectional view showing a thermal decomposition trap according to an embodiment of the present invention. In the thermal decomposition trap shown in FIG. 3, heater chamber 22, opened to outer atmosphere, for housing heater 23, is inserted near a central portion of trap main body 21. Main body 21 houses metal mesh plates 24, for example made of copper, so that plates 24 surround chamber 22. Band heater 25 is wound around main body 21. Inlet port 26 having valve V1 and outlet port 27 having valve V2 are formed in lower and upper portions of main body 21. Vibrator 35 is connected to the upper end of mesh plates 24 by means of vibration transporting member 36.

Conical oil trap 28 is formed on a bottom portion of main body 21. Oil discharge port 29 is formed in a bottom portion of oil trap 28, and valve V3 is mounted on port 29. A predetermined amount of oil is contained in oil trap 28. In this case, an oil normally used for a pump is used. Oil trap 28 has oil supply port 30 having valve V4 thereon. The oil is supplied from port 30 in oil trap 28.

Cooling pipe 31 is disposed around oil trap 28, and cooling water is flowed through pipe 31 to cool the oil in oil trap 28. As a result, evaporation or thermal decomposition of the oil can be prevented. Pressure switch 33 for preventing an excessive increase in pressure in the trap and line 34 for supplying an inert gas such as nitrogen are mounted on an upper side portion of main body 21. Valve V5 is mounted on line 34.

In the above thermal decomposition trap, a gas from the reaction chamber is supplied from inlet port 26 to main body 21 and thermally decomposed on plates 24 heated by heaters 23 and 25. The decomposed gas is exhausted from outlet port 27 to the rotary pump. Particles generated by thermal decomposition fall into the oil in oil trap 28. Particles attached to the surface of plates 24 can be easily dropped by actuation of vibrator 35.

When a large amount of particles are deposited in oil trap 28 by a long-time thermal decomposition, the oil must be exchanged. This operation is performed as follows.

That is, while valves V1 and V2 are kept closed, valve V5 is opened to supply nitrogen gas in the trap. The nitrogen gas is supplied until an atmospheric pressure or the pressure immediately before an atmospheric pressure is obtained in the trap. Then, valves V3 and V5 are opened to slowly supply the nitrogen gas to discharge the oil. Thereafter, valve V3 is closed before the oil in oil trap 28 is completely discharged. Finally, valve V4 is opened to supply a new oil, thereby completing an oil exchange operation. If necessary, such an oil exchange operation can be repeated, so that trap 28 is cleaned.

In this manner, toxic particles generated by thermal decomposition of the exhaust gas from the reaction chamber can be safely and easily removed from the trap in a short time period without opening the trap to expose its interior to the outer atmosphere.

When a W film was actually formed on a silicon wafer by CVD using $WF_6$ and hydrogen as a source gas in the reaction chamber, a gas containing non-reacted $WF_6$ was exhausted from the reaction chamber. When the gas was thermally decomposed by the thermal decomposition trap shown in FIG. 3, particles containing W was produced as particles. This particles were precipitated in the oil in oil trap 28 and was easily removed therefrom by the above operation.

Figure 4:
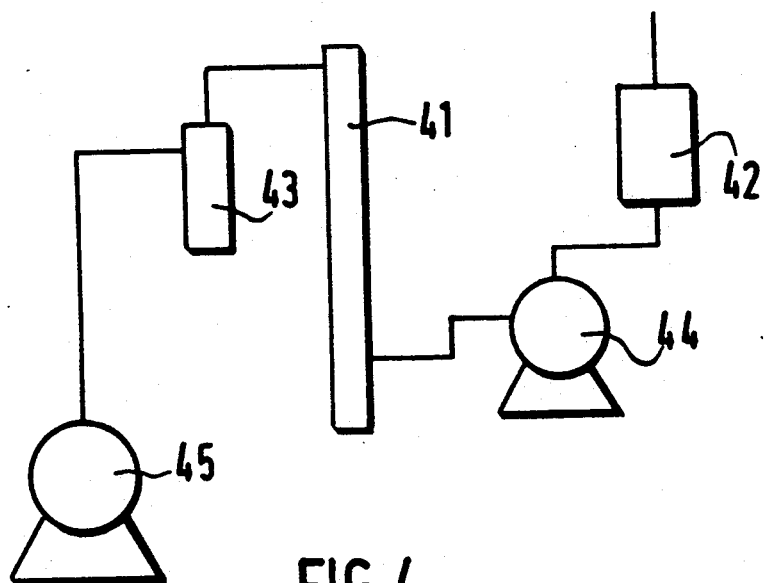
FIG. 4 is a flowchart of a thermal decomposition apparatus adopting the thermal decomposition trap shown in FIG. 3.

FIG. 4 is a flowchart of a thermal decomposition apparatus adopting the thermal decomposition trap shown in FIG. 3. In FIG. 4, mechanical booster pump 44 is arranged on the downstream side immediately after reaction chamber 42, and thermal decomposition trap 41, oil trap 43 and rotary pump 45 are arranged on its downstream side. In this arrangement, since oil-free pump 44 is arranged on the downstream side immediately after chamber 42, an exhaust rate in chamber 42 obtained by pumps 44 and 45 is not reduced due to a pressure loss by trap 41. In addition, the pressure in the reaction chamber can be adjusted without any variation.

I claim:

1. A thermal decomposition trap comprising a trap main body having an inlet port for supplying a gas to be thermally decomposed and an outlet port for exhausting the gas, and heating means for heating the gas supplied in said trap main body, wherein an oil trap containing an oil and having an oil discharge port and a valve connected thereto is formed on a bottom portion of said trap main body; and wherein a cooling means is located around said oil trap to prevent evaporation and decomposition of the oil.

2. A trap according to claim 1, wherein said heating means are located at a central portion of, and around, said trap main body.

3. A trap according to claim 1, wherein metal mesh plates are located in said trap main body.

4. A trap according to claim 1, wherein said thermal decomposition trap has an inert gas supply inlet port.

5. A thermal decomposition apparatus comprising, in serial connection, a reaction chamber, a thermal decomposition trap for thermally decomposing a gas from said reaction chamber, and an oil-free auxiliary pump and a main pump for exhausting said reaction chamber;

wherein said thermal decomposition trap comprises a trap main body having an inlet port for supplying a gas to be thermally decomposed and an outlet port for exhausting the gas, heating means for heating the gas supplied in said trap main body, and an oil trap, mounted on a bottom portion of said trap main body containing an oil, and having an oil discharge port and a valve connected thereto;

said auxiliary pump is connected to an outlet port of said reaction chamber and said inlet port of said thermal decomposition trap; and said main pump is connected to said outlet portion of said thermal decomposition trap.

6. An apparatus according to claim 5, wherein said main pump comprises a rotary pump.

7. An apparatus according to claim 5, wherein said auxiliary pump comprises a pump selected from the group consisting of a mechanical booster pump and a turbo molecular pump.

8. An apparatus according to claim 5, wherein an oil trap is located between said thermal decomposition trap and said main pump.

* * * * *